United States Patent
Butler et al.

(10) Patent No.: US 9,540,054 B2
(45) Date of Patent: Jan. 10, 2017

(54) AERODYNAMIC AND DEFLECTABLE ROOF FAIRING ATTACHMENT FOR TRACTOR-TRAILER VEHICLES

(71) Applicant: FlowBelow Aero, Inc., Austin, TX (US)

(72) Inventors: Joshua L. Butler, Austin, TX (US); Kyle H. Walker, Austin, TX (US); Nicholas Athey, Austin, TX (US)

(73) Assignee: FlowBelow Aero, Inc., Austin, TX (US)

( * ) Notice: Subject to any disclaimer, the term of this patent is extended or adjusted under 35 U.S.C. 154(b) by 14 days.

(21) Appl. No.: 14/741,994

(22) Filed: Jun. 17, 2015

(65) Prior Publication Data

US 2015/0360735 A1 Dec. 17, 2015

Related U.S. Application Data

(60) Provisional application No. 62/012,979, filed on Jun. 17, 2014.

(51) Int. Cl.
*B62D 35/00* (2006.01)

(52) U.S. Cl.
CPC .................................. *B62D 35/001* (2013.01)

(58) Field of Classification Search
CPC .................................................... B62D 35/001
See application file for complete search history.

(56) References Cited

U.S. PATENT DOCUMENTS

| | | | |
|---|---|---|---|
| 2,863,695 A | 12/1958 | Stamm | |
| 3,425,740 A * | 2/1969 | Vaughn | B62D 35/002 135/117 |
| 3,866,967 A * | 2/1975 | Landry | B62D 35/001 105/1.2 |
| 4,006,931 A | 2/1977 | Groves | |
| 4,102,548 A | 7/1978 | Kangas | |
| 4,103,957 A * | 8/1978 | Landry | B62D 35/001 105/1.2 |
| 4,156,543 A | 5/1979 | Taylor et al. | |
| 4,170,378 A * | 10/1979 | Jacobsen | B62D 35/002 296/163 |
| 4,199,185 A | 4/1980 | Woolcock | |
| 4,214,787 A * | 7/1980 | Chain | B62D 35/001 105/1.2 |
| 4,245,862 A | 1/1981 | Buckley, Jr. | |
| 4,290,639 A | 9/1981 | Herpel | |
| 4,309,053 A * | 1/1982 | Lett | B62D 35/001 296/180.4 |
| 4,316,630 A | 2/1982 | Evans | |

(Continued)

*Primary Examiner* — Lori L Lyjak (74) *Attorney, Agent, or Firm* — Meyertons, Hood, Kivlin, Kowert & Goetzel, P.C.; Eric B. Meyertons (57) ABSTRACT

In some embodiments, a system and/or method may include a fairing system for vehicles. The fairing system may include a roofing extender. The roofing extender may be couplable rearward of a roof of a vehicle. In some embodiments, a frontward portion of the roofing extender may be coupled to the roof of the vehicle such that the roofing extender pivots, at the frontward portion, relative to the roof of the vehicle. In some embodiments, a rearward portion of the roofing extender may be coupled to the vehicle with a resilient member which allows the roofing extender to pivot relative to the roof of the vehicle within a specified range as needed before returning to set start point. In some embodiments, the roofing extender functions to adjust airflow over the roof of the vehicle.

20 Claims, 9 Drawing Sheets

(56) References Cited

U.S. PATENT DOCUMENTS

| | | | |
|---|---|---|---|
| 4,360,232 A | | 11/1982 | Elder |
| 4,607,874 A | | 8/1986 | Peairs |
| 4,749,220 A | | 6/1988 | Adams et al. |
| 4,775,179 A | | 10/1988 | Riggs |
| 4,779,915 A | * | 10/1988 | Straight ............... B62D 35/001 296/180.3 |
| 4,784,424 A | | 11/1988 | Wiley, Jr. |
| 4,904,015 A | | 2/1990 | Haines |
| 5,174,626 A | * | 12/1992 | Wiley, Jr. ............. B62D 35/001 296/180.1 |
| 5,317,880 A | | 6/1994 | Spears |
| 5,538,316 A | * | 7/1996 | Bartholomew ...... B62D 35/001 296/180.3 |
| 6,183,041 B1 | | 2/2001 | Wilson |
| 6,428,084 B1 | * | 8/2002 | Liss ..................... B62D 35/001 296/180.1 |
| 6,991,281 B2 | | 1/2006 | Spence et al. |
| 7,073,845 B2 | * | 7/2006 | Ortega ................. B62D 35/001 296/180.2 |
| 2002/0021023 A1 | * | 2/2002 | Leban .................. B62D 35/001 296/180.1 |
| 2009/0184539 A1 | * | 7/2009 | Pursley ................ B62D 35/001 296/180.3 |
| 2015/0166129 A1 | * | 6/2015 | Camosy ............... B62D 35/001 296/180.4 |

* cited by examiner

AERODYNAMIC AND DEFLECTABLE ROOF FAIRING ATTACHMENT FOR TRACTOR-TRAILER VEHICLES

PRIORITY CLAIM

This application claims priority to U.S. Provisional Patent Application No. 62/012,979 entitled "AERODYNAMIC AND DEFLECTABLE ROOF FAIRING INSERT FOR LAND VEHICLES" filed on Jun. 17, 2014, all of which is incorporated by reference herein.

BACKGROUND OF THE INVENTION

1. Field of the Invention

The present disclosure generally relates to vehicle fairings. More particularly, the disclosure generally relates to a method and system for adjusting airflow over the roof of a vehicle using a roofing extender.

2. Description of the Relevant Art

Vehicles (e.g., trucks and/or tractor-trailer combinations) are available in many different configurations. The aerodynamic properties of the configurations may have a significant effect on the fuel efficiency of the vehicles. As such, systems for improving the aerodynamic performance of vehicles (e.g., load-carrying vehicles) have been developed.

It is known in the art that the roof fairing is a component on a long haul tractor that reduces aerodynamic drag and thereby improves fuel efficiency of the tractor-trailer vehicle. However, conventional roof fairings are not aerodynamically optimal because they need to provide clearance at the top area behind the cab for one or more of the following reasons: a roof extension mounted behind the roof fairing may become damaged when a portion of the trailer contacts the extension such as when the tractor and trailer articulate; and the tractor may be configured with exhaust stacks that would interfere with a roof extension.

It may be advantageous to provide a fairing which is deflectable within a range without incurring damage.

SUMMARY

An aerodynamic and deflectable roof fairing extension assembly is provided for a vehicle whereby the fairing extension is able to deflect and return to its original position in the event that a portion of a trailer or other object comes into contact with the fairing extension. The roof fairing extension is attached to the truck and cooperates with the existing aerodynamic roof fairing of the vehicle in order to further improve the aerodynamics and thus the fuel efficiency of a truck in combination with a trailer. One advantage of a deflectable fairing extension versus other roof fairing extensions may be that a deflectable fairing extension may be more durable and able to withstand impacts and collisions. Another advantage of a deflectable fairing extension is that the deflectable fairing extension may be larger than other fairing extensions because it is able contact the trailer or other objects during regular or irregular use. In some embodiments, larger fairing extension may allow more substantial or complete closure of the gap between a tractor and trailer.

In some embodiments, a system and/or method may include a fairing system for vehicles. The fairing system may include a roofing extender. The roofing extender may be couplable rearward of a roof of a vehicle. In some embodiments, a frontward portion of the roofing extender may be coupled to the roof of the vehicle such that the roofing extender pivots, at the frontward portion, relative to the roof of the vehicle. In some embodiments, a rearward portion of the roofing extender may be coupled to the vehicle with a resilient member which allows the roofing extender to pivot relative to the roof of the vehicle within a specified range as needed before returning to set start point. In some embodiments, the roofing extender functions to adjust airflow over the roof of the vehicle.

In some embodiments, the roofing extender functions to adjust airflow over the roof of the vehicle and an area between the vehicle and a trailer coupled to the vehicle.

In some embodiments, the roofing extender improves, during use, airflow between the vehicle and the trailer such that an efficiency of a temperature regulation mechanism associated with the trailer is improved by adjusting an airflow adjacent the temperature regulation mechanism.

In some embodiments, an elongated member couples the fairing system to the vehicle and/or a trailer coupled to the vehicle. The elongated member may function to inhibit disconnection of the fairing system in the event that other coupling mechanisms fail.

In some embodiments, the roofing extender comprises at least two resilient members. The resilient member may include a spring. The resilient member may include a damper.

In some embodiments, the fairing system may include an adjustment mechanism coupled to the rearward portion of the roofing extender. In some embodiments, the adjustment mechanism adjusts a distance between the rearward portion of the roofing extender and a plane within which the roof of the vehicle lies. In some embodiments, the adjustment mechanism adjusts an angle between the roofing extender and the roof of the vehicle.

In some embodiments, the fairing system may include at least one opening configured to accommodate exhaust stacks from the vehicle.

In some embodiments, a second fairing system coupled to an exterior surface of a trailer coupled to the vehicle.

In some embodiments, a frontward portion of the roofing extender is coupled to the roof of the vehicle such that there is an opening between the roofing extender and the roof of the vehicle allowing air to flow through the opening during use.

In some embodiments, the roofing extender comprises two or more portions which move independently of one another.

BRIEF DESCRIPTION OF THE DRAWINGS

Advantages of the present invention may become apparent to those skilled in the art with the benefit of the following detailed description of the preferred embodiments and upon reference to the accompanying drawings.

While the invention is susceptible to various modifications and alternative forms, specific embodiments thereof are shown by way of example in the drawings and may herein be described in detail. The drawings may not be to scale. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

The headings used herein are for organizational purposes only and are not meant to be used to limit the scope of the description. As used throughout this application, the word "may" is used in a permissive sense (i.e., meaning having the potential to), rather than the mandatory sense (i.e., meaning must). The words "include," "including," and "includes" indicate open-ended relationships and therefore mean including, but not limited to. Similarly, the words "have," "having," and "has" also indicated open-ended relationships, and thus mean having, but not limited to. The terms "first," "second," "third," and so forth as used herein are used as labels for nouns that they precede, and do not imply any type of ordering (e.g., spatial, temporal, logical, etc.) unless such an ordering is otherwise explicitly indicated. For example, a "third die electrically connected to the module substrate" does not preclude scenarios in which a "fourth die electrically connected to the module substrate" is connected prior to the third die, unless otherwise specified. Similarly, a "second" feature does not require that a "first" feature be implemented prior to the "second" feature, unless otherwise specified.

Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. §112 paragraph (f), interpretation for that component.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

It is to be understood the present invention is not limited to particular devices or biological systems, which may, of course, vary. It is also to be understood that the terminology used herein is for the purpose of describing particular embodiments only, and is not intended to be limiting. As used in this specification and the appended claims, the singular forms "a", "an", and "the" include singular and plural referents unless the content clearly dictates otherwise. Thus, for example, reference to "a linker" includes one or more linkers.

DETAILED DESCRIPTION

Definitions

Unless defined otherwise, all technical and scientific terms used herein have the same meaning as commonly understood by one of ordinary skill in the art.

The term "connected" as used herein generally refers to pieces which may be joined or linked together.

The term "coupled" as used herein generally refers to pieces which may be used operatively with each other, or joined or linked together, with or without one or more intervening members.

The term "directly" as used herein generally refers to one structure in physical contact with another structure, or, when used in reference to a procedure, means that one process effects another process or structure without the involvement of an intermediate step or component.

In some embodiments, a fairing system is provided for a vehicle. The fairing system may be couplable to a vehicle. The fairing system may be able to deflect and return to its original position in the event that a portion of the vehicle, an associated trailer or other object, associated or unassociated (e.g., low hanging tree branch, bridge, sign, etc.), comes into contact with the fairing system. The roof system may be coupled (e.g., directly attached) to the vehicle and in some embodiments cooperates with the existing aerodynamic roof fairing of the vehicle in order to further improve the aerodynamics and thus the fuel efficiency of a truck in combination with, for example, a trailer. One advantage of a deflectable fairing system versus other roof fairing extensions may be that a deflectable fairing system may be more durable and able to withstand impacts and collisions. Another advantage of a deflectable fairing system is that the deflectable fairing extension may be larger than other fairing extensions because it is able contact the trailer or other objects during regular or irregular use.

Figure 1:
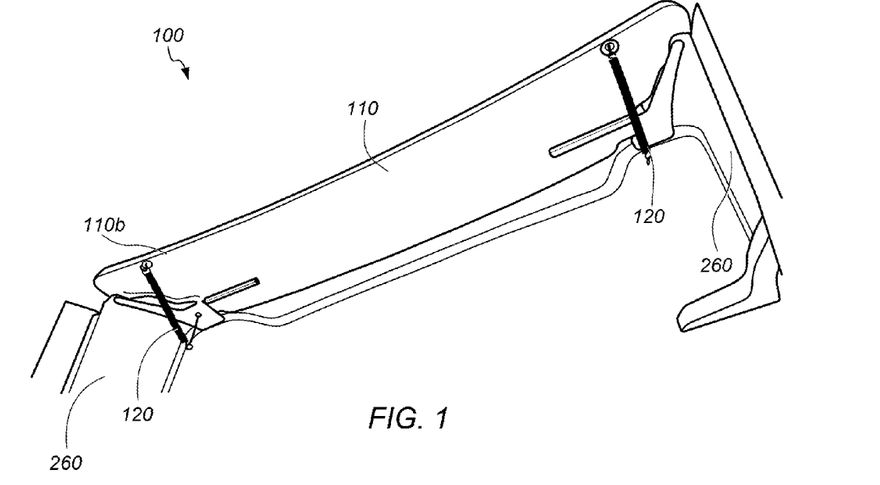
FIG. 1 depicts a rear bottom perspective view of a representation of an embodiment of a roofing extender.
Figure 2:
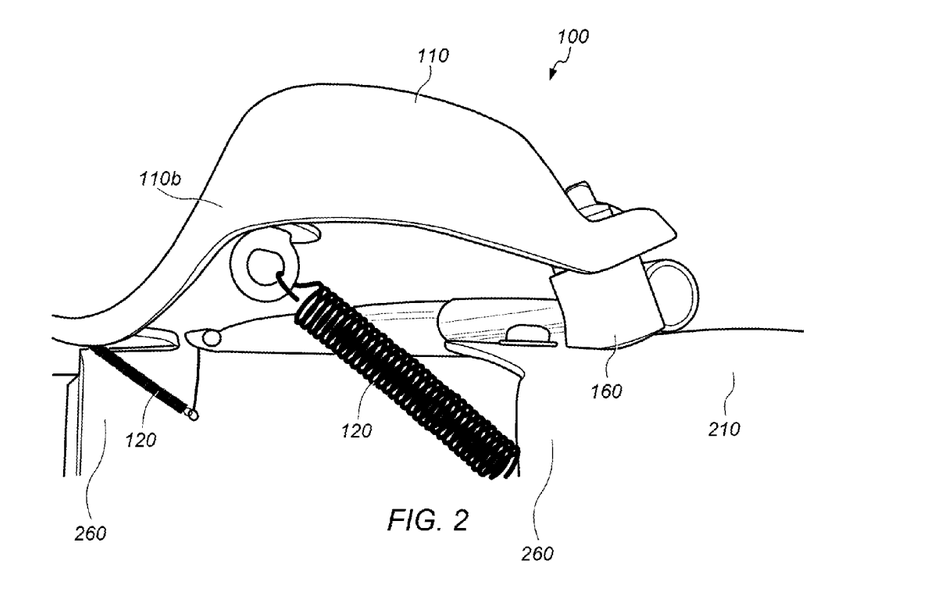
FIG. 2 depicts a side bottom perspective view of a representation of an embodiment of a roofing extender.
Figure 3A:
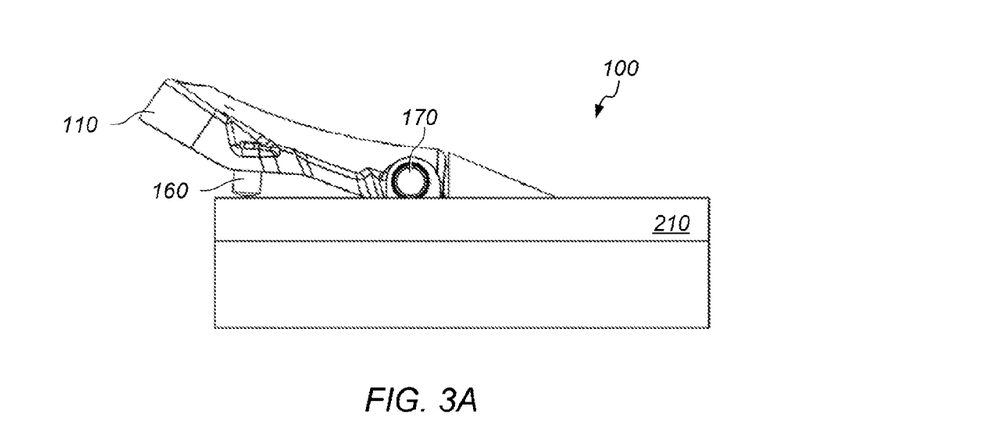
FIG. 3A depicts a side view of a representation of an embodiment of a roofing extender positioned in a minimum angle/deflection orientation.
Figure 3B:
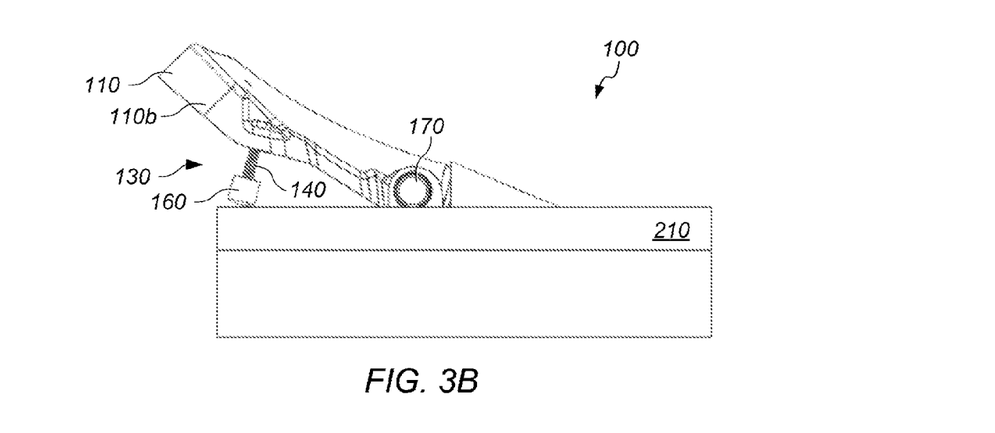
FIG. 3B depicts a side view of a representation of an embodiment of a roofing extender positioned in an extended angle/deflection orientation using an extended adjustment mechanism.
Figure 3C:
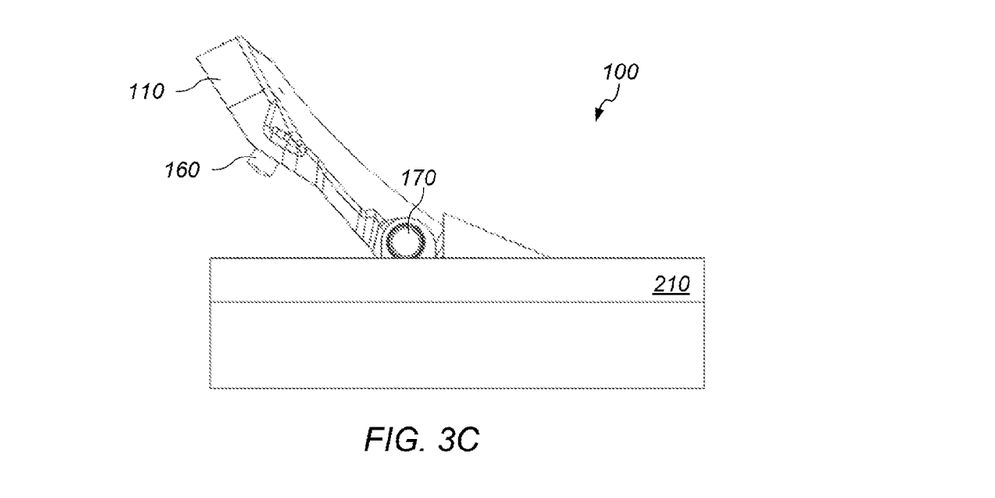
FIG. 3C depicts a side view of a representation of an embodiment of a roofing extender positioned in a maximum angle/deflection orientation.
Figure 4A:
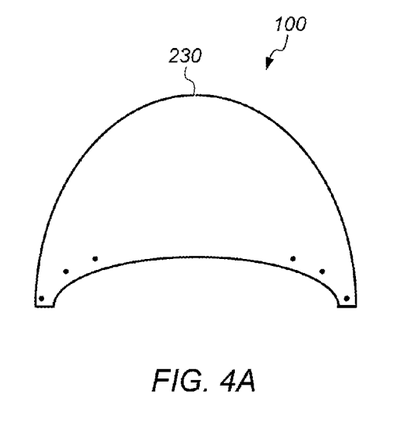
FIGS. 4A-D depict a top view of a representation of an embodiment of a roofing extender coupled to various roof fairings.
Figure 4B:
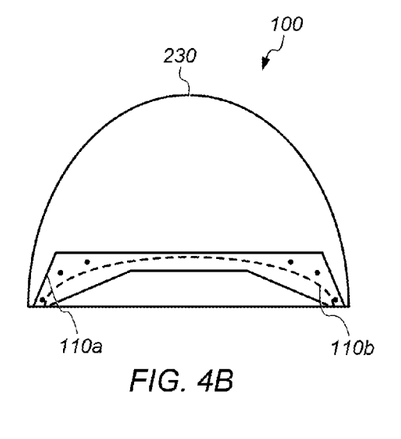
Figure 4C:
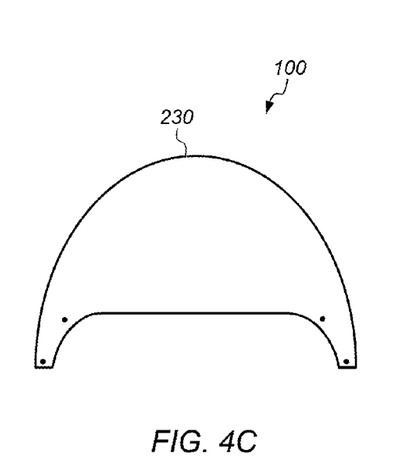
Figure 4D:
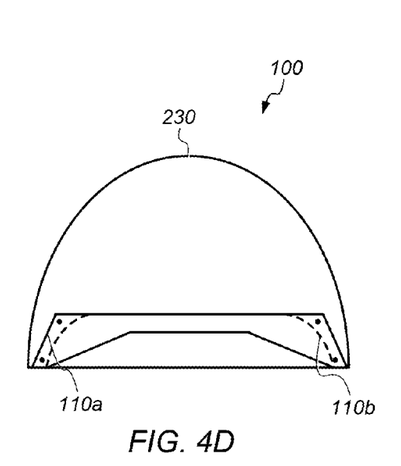

In some embodiments, a system and/or method may include a fairing system for vehicles. FIGS. 1-3 depict a rear bottom perspective view of a representation of an embodiment of a fairing system 100 including a roofing extender 110. The roofing extender 110 may be couplable rearward of a roof 210 of a vehicle 200. The roofing extender 110 is typically couplable upward of a side extender 260 (i.e. gap fairing). In some embodiments, a frontward portion 110a of the roofing extender 110 may be coupled to the roof 210 of the vehicle 200 such that the roofing extender pivots, at the frontward portion, relative to the roof of the vehicle. In some embodiments, a rearward portion 110b of the roofing extender 110 may be coupled to the vehicle 200 with a resilient member 120 which allows the roofing extender to pivot relative to the roof of the vehicle within a specified range as needed before returning to set start point. In some embodiments, the roofing extender functions to adjust airflow over the roof of the vehicle.

In some embodiments, a fairing system may be coupled to a vehicle. The fairing system may be coupled to one or more portions of the vehicle. Typically the fairing system may be coupled to a roof of the vehicle (e.g., forward or rearward). The fairing system may be coupled to a side of the vehicle (e.g., forward or rearward). The fairing system may be coupled to a trailer coupled to the vehicle (e.g., a roof of the vehicle (e.g., forward or rearward) or a side of the vehicle (e.g., forward or rearward)).

Figure 5:
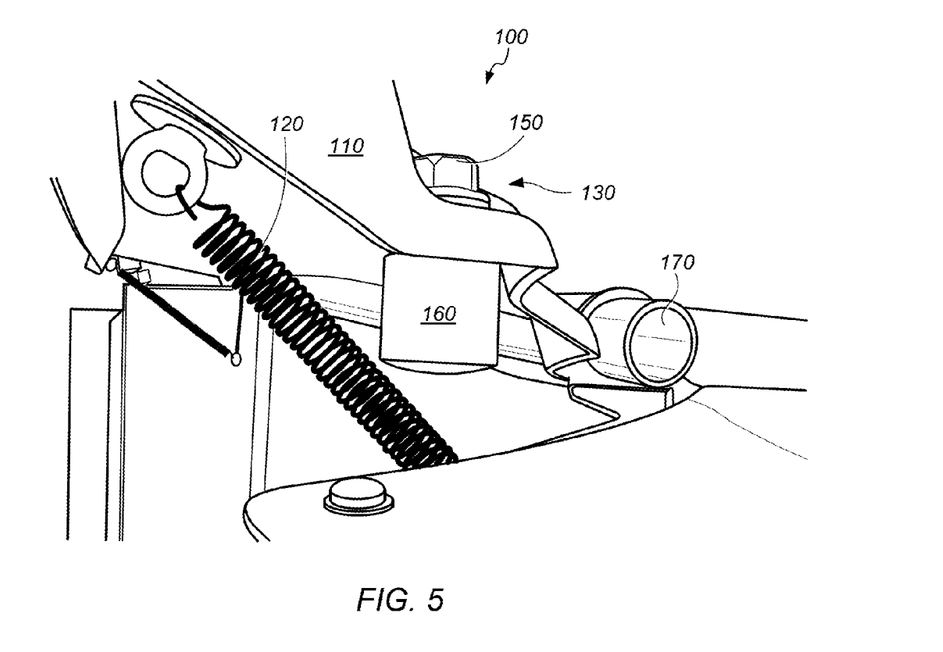
FIG. 5 depicts a right perspective view of a representation of an embodiment of a roofing extender portion including a resilient member.
Figure 6:
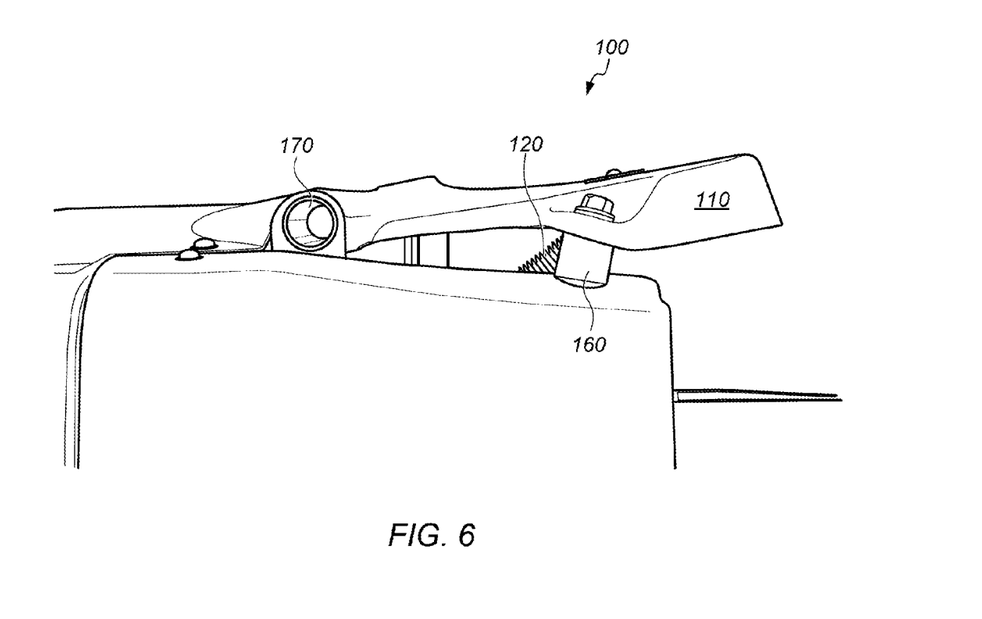
FIG. 6 depicts a side view of a representation of an embodiment of a roofing extender, coupled to a cab of a vehicle, positioned in a minimum angle/deflection orientation.
Figure 7:
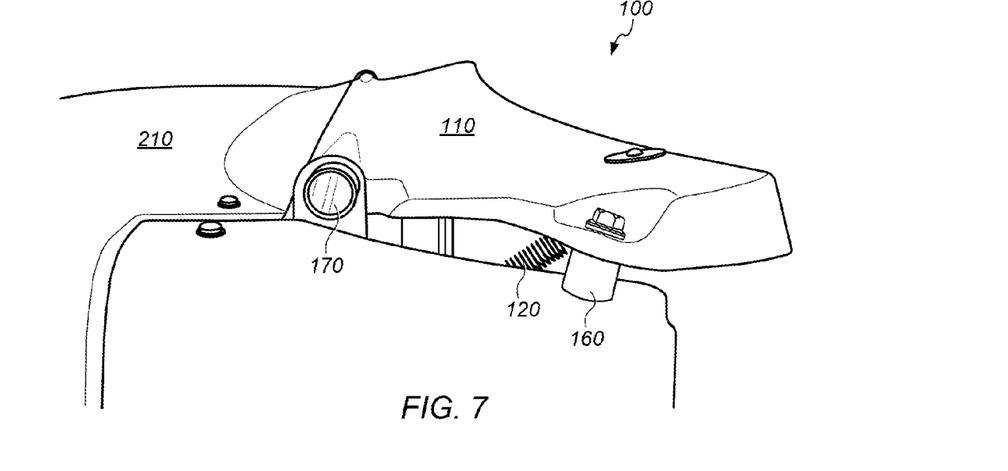
FIG. 7 depicts a top left side view of a representation of an embodiment of a roofing extender, coupled to a cab of a vehicle, positioned in a minimum angle/deflection orientation.
Figure 8:
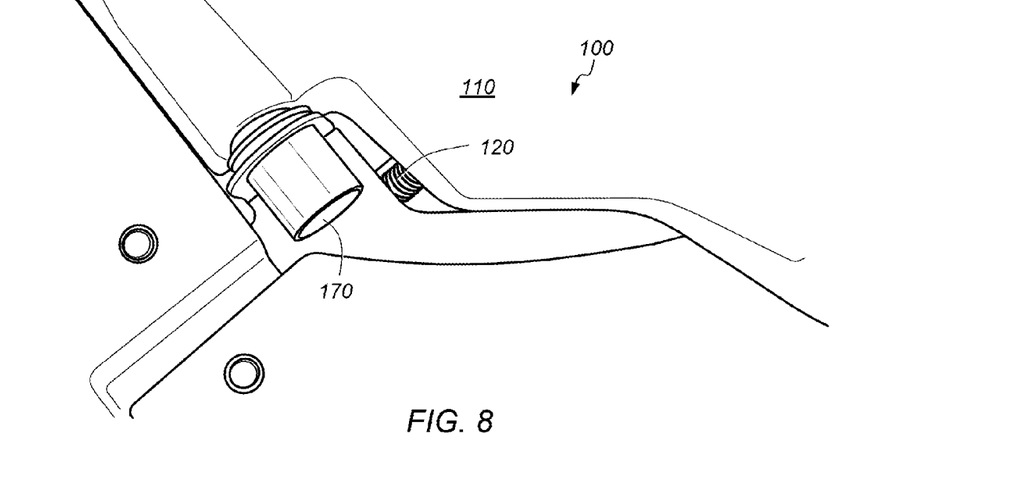
FIG. 8 depicts a top left perspective view of a representation of an embodiment of a roofing extender portion including a pivoting coupling mechanism.

In some embodiments, a frontward portion 110a of the roofing extender 110 may be coupled to the roof 210 of the vehicle 200 such that the roofing extender pivots, at the frontward portion, relative to the roof of the vehicle. The pivoting coupling 170 may include a bushing (e.g., as depicted in FIGS. 3, 5, and 8). A bushing may include an independent plain bearing that is inserted into a housing to provide a bearing surface for rotary applications. Common designs include solid (sleeve and flanged), split, and clenched bushings. A sleeve, split, or clenched bushing is only a "sleeve" of material with an inner diameter, outer diameter, and length. The difference between the three types is that a solid sleeved bushing is solid all the way around, a split bushing has a cut along its length, and a clenched bearing is similar to a split bushing but with a clench (or clinch) across the cut. A flanged bushing is a sleeve bushing with a flange at one end extending radially outward from the outer diameter. The flange may be used to positively locate the bushing when it is installed or to provide a thrust bearing surface. In some embodiments, a single roofing extender may include multiple bushings, for example, due to the shape of the roofing extender).

Figure 9:
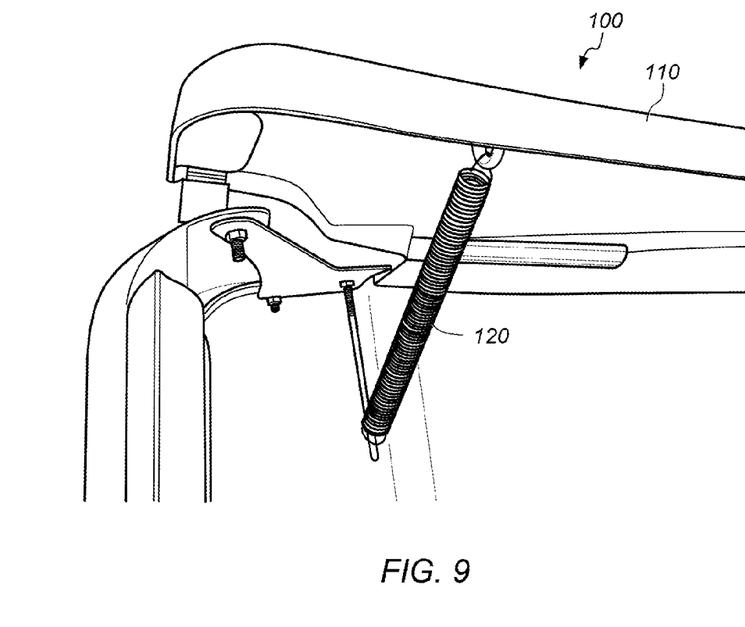
FIG. 9 depicts a left bottom perspective view of a representation of an embodiment of a roofing extender portion including a resilient member.

In some embodiments, the roofing extender comprises at least two resilient members 120 (e.g., as depicted in FIGS. 1-2, 5, and 9). The resilient member may include a spring. The resilient member may include a damper. The resilient member may be configured to allow the extender to deflect in more than one direction (i.e. like a swinging door). In some embodiments, the resilient member may be configured to allow the extension to deflect in any direction or axis of rotation. In some embodiments, the deflectable roof fairing system may be deflectable using spring-loaded means or other means such as a shock to provide acceptable deflection in the event that a portion of a trailer or other object comes into contact with the fairing extension. In some embodiments, a resilient member may be coupled to a rearward underside of the roofing extender 110 and to a portion of the vehicle 200 (e.g., as depicted in FIGS. 1 and 9). As, for example, a portion of the roofing extender inadvertently strikes something the roofing extender may pivot from a first position to a second position (or as far as necessary/caused by the striking object) and then after the applied force has been removed the resilient member(s) may convey the roofing extender from the second position back to the first position.

In some embodiments, a pivot axis for deflection of the extension may be located in different locations (i.e. in the middle of the extension).

In some embodiments, a 4-bar linkage or other mechanism may also be used to provide a preferred deflection direction or path for deflection.

In some embodiments, the fairing system 100 may include an adjustment mechanism 130 coupled to the rearward portion 110b of the roofing extender 110 (e.g., as depicted in FIGS. 3B and 5). In some embodiments, the adjustment mechanism 130 adjusts a distance between the rearward portion of the roofing extender and a plane within which the roof of the vehicle lies. In some embodiments, the adjustment mechanism adjusts an angle between the roofing extender and the roof of the vehicle. In some embodiments, the extension may be manually or automatically operated as desired to re-position or secure the extension in any position within its normal range of movement.

In some embodiments, the adjustment mechanism 130 include any type of adjustable length mechanism which is stable and structurally supportive through a range of use. In some embodiments, the adjustment mechanism may include a piston (e.g., hydraulic). In some embodiments, the adjustment mechanism may include a rod or elongated member 140 coupled to a threaded opening or nut 150 (e.g., as depicted in FIGS. 3B and 5) such that a length of the threaded rod may be adjusted from a first position (e.g., FIG. 3A) to an elevated second position (e.g., FIG. 3B) as needed to, for example, increase fuel efficiency. In some embodiments, the deflectable roof fairing system may increase, decrease, or maintain the angle at which airflow is directed rearward from the vehicle's roof fairing using, for example, the adjustment mechanism. In some embodiments, the closed position of the deflectable roof fairing system may be adjusted to provide a preferred airflow or for another reason, such as a preferred maximum height.

In some embodiments, the adjustment mechanism 130 may include an isolator bushing 160. The adjustment may include an isolator bushing positioned between the adjustment mechanism and the roof of the vehicle. The isolator bushing may function to absorb, during use, vibrations. A bushing or rubber bushing is a type of vibration isolator. It provides an interface between two parts, damping the energy transmitted through the bushing. A rubber bushing may also be described as a flexible mounting or antivibration mounting.

In some embodiments, the adjustment mechanism may include a power source and a control system such that the angle is adjusted in an automated fashion. In some embodiments, an automated fashion may include a user in the cab of a vehicle remotely adjusting the angle of the roofing extender. In some embodiments, an automated fashion may include the roofing extender adjusting automatically based upon a software run control system (e.g., using input from sensors and/or input from a user in the cab or remotely in a control center) to increase the efficiency of the vehicle as conditions change (e.g., speed of the vehicle, wind speed and/or direction). This may be useful in order to adjust the position of the extension in order to optimize the aerodynamic performance of the extension at different speeds, for example. It may be useful to automatically retract the extension at low speeds, for example, in order to reduce the likelihood of damage during low speed loading/unloading operations. It may be useful to automatically deploy the extension at higher speeds, for example, since aerodynamic drag is much more significant at higher speeds.

In some embodiments, the deflectable roof fairing system may contact a trailer coupled to the vehicle during normal use or it may not.

FIGS. 10A-G depict a tractor connected to two "pup" trailers (combination vehicle) traveling in a forward direction over a road whereby the tractor and trailers are configured with deflectable roof fairing extensions in various combinations and states of activation. FIGS. 10A-G depict examples of how deflectable roof fairing extensions work during use to decrease damage to the extensions. FIG. 14A depicts a side view of a representation of an embodiment of a combination vehicle 200 whereby the tractor and trailers 220 are configured with: a) roofing extender 110a attached to tractor roof fairing 230, b) roofing extender 110b attached to upper rear region of first trailer 220a, c) roofing extender 110c attached to upper rear region of second trailer 220b.

Figure 10A:
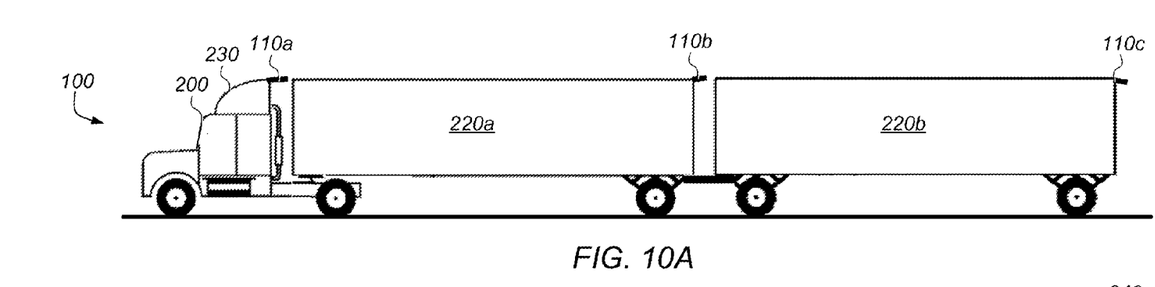
FIG. 10A depicts a side view of a representation of an embodiment of a combination vehicle traveling in a forward direction over a road whereby the tractor and trailers are configured with: a) roofing extender attached to tractor roof fairing, b) roofing extender attached to upper rear region of first trailer, c) roofing extender attached to upper rear region of second trailer.
Figure 10B:
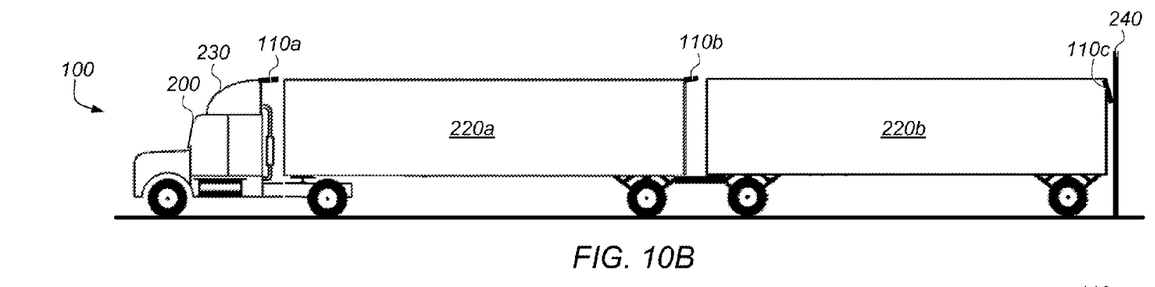
FIG. 10B depicts a side view of a representation of an embodiment of a combination vehicle configured as shown in FIG. 10A whereby extension attached to upper rear region of second trailer is deflected DOWNWARD when the combination vehicle backs into a wall or object.

FIG. 10B depicts a side view of a representation of an embodiment of a combination vehicle 200 configured as shown in FIG. 10A whereby extender 110c attached to upper rear region of second trailer 220b is deflected DOWNWARD when the combination vehicle backs into a wall 240 or contacts an object such that no or less damage is sustained by extender 110c.

Figure 10C:
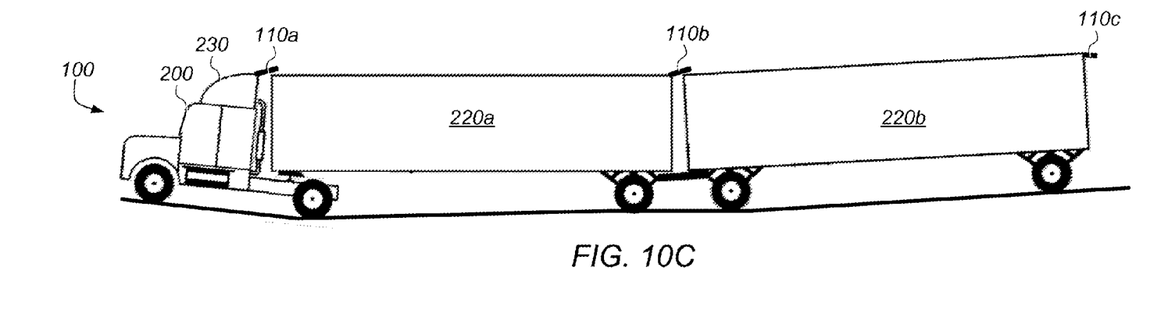
FIG. 10C depicts a side view of a representation of an embodiment of a combination vehicle configured as shown in FIG. 10A whereby the tractor and trailers are articulated due to a non-level road and a) extension attached to tractor roof fairing is deflected UPWARD, b) extension attached to upper rear region of first trailer is deflected UPWARD by contacting the second trailer.

FIG. 10C depicts a side view of a representation of an embodiment of a combination vehicle 200 configured as shown in FIG. 10A whereby the tractor and trailers are articulated due to a non-level road and a) extender 110a attached to tractor roof fairing 230 is deflected UPWARD, b) extender 110b attached to upper rear region of first trailer 220a is deflected UPWARD by contacting the second trailer 220b.

Figure 10D:
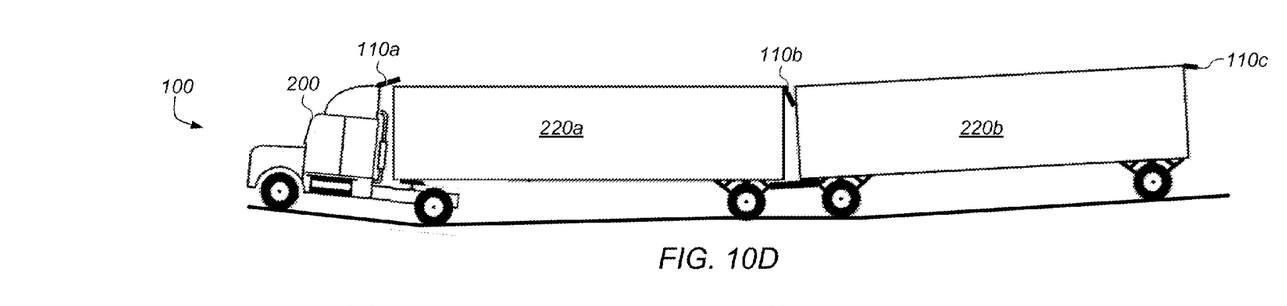
FIG. 10D depicts a side view of a representation of an embodiment of a combination vehicle as depicted in FIG. 10C whereby the extension attached to upper rear region of first trailer is deflected DOWNWARD by the second trailer.

FIG. 10D depicts a side view of a representation of an embodiment of a combination vehicle 200 as depicted in FIG. 10C whereby the extender 110b attached to upper rear region of first trailer 220a is deflected DOWNWARD by the second trailer.

Figure 10E:
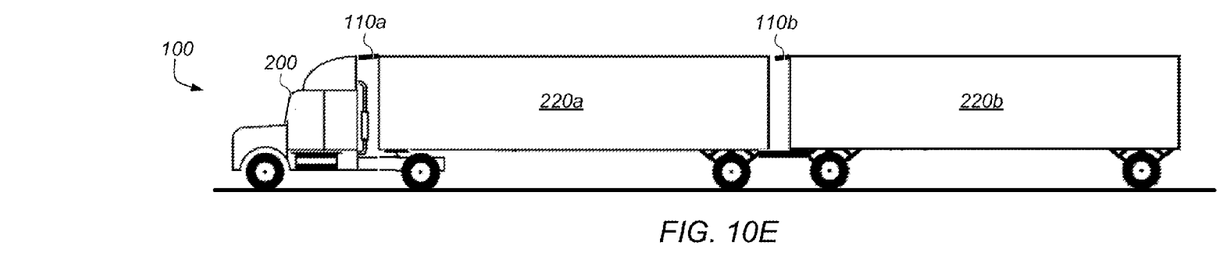
FIG. 10E depicts a side view of a representation of an embodiment of a combination vehicle in normal operation traveling over a substantially level road with: a) extender attached to front upper region of first trailer, b) extender attached to front upper region of second trailer.

FIG. 10E depicts a side view of a representation of an embodiment of a combination vehicle 200 in normal operation traveling over a substantially level road with: a) an extender 110a attached to front upper region of first trailer 220a, b) an extender 110b attached to front upper region of second trailer 220b.

Figure 10F:
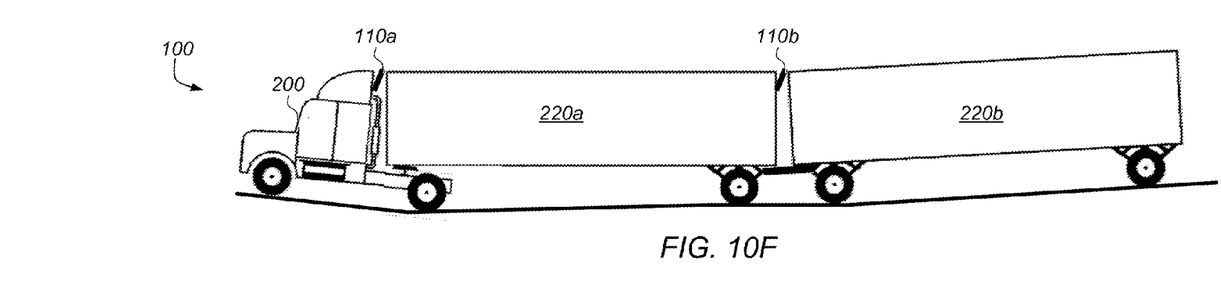
FIG. 10F depicts a side view of a representation of an embodiment of a combination vehicle configured as shown in FIG. 10E whereby the tractor and trailers are articulated due to a non-level road and a) extension attached to upper front region of first trailer is deflected DOWNWARD by the tractor, b) extension attached to upper front region of second trailer is deflected DOWNWARD by contacting the first trailer.

FIG. 10F depicts a side view of a representation of an embodiment of a combination vehicle 200 configured as shown in FIG. 10E whereby the tractor and trailers are articulated due to a non-level road and a) the extender 110a attached to upper front region of first trailer 220a is deflected DOWNWARD by the tractor, b) the extender 110b attached to upper front region of second trailer 220b is deflected DOWNWARD by contacting the first trailer 220a.

Figure 10G:
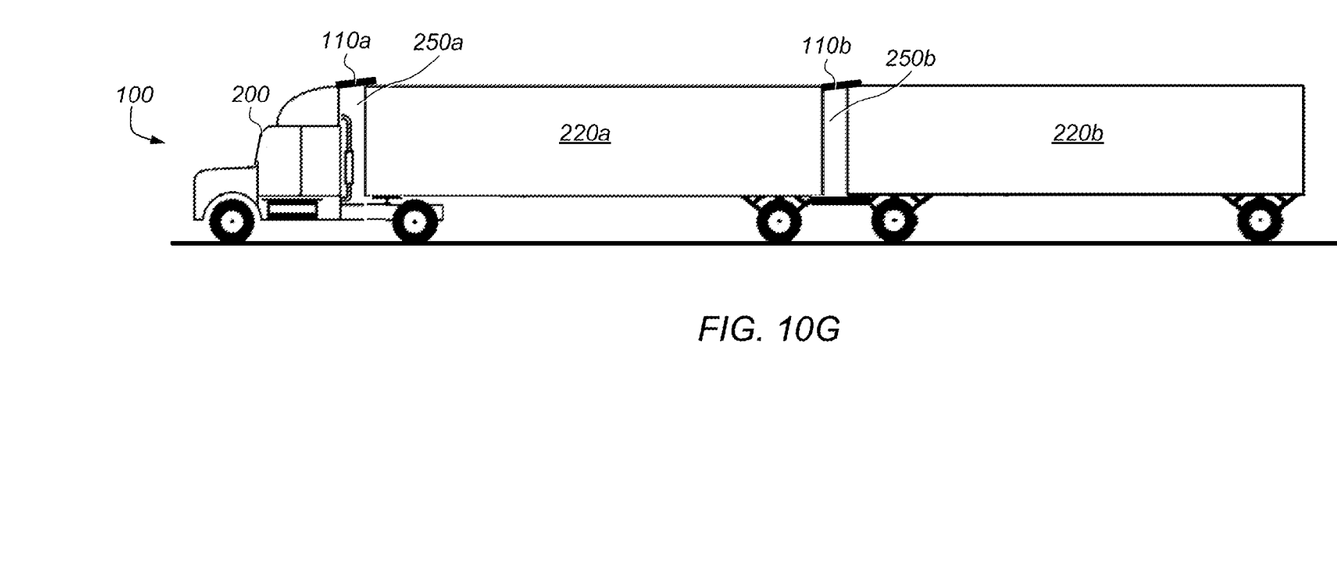
FIG. 10G depicts a side view of a representation of an embodiment of a combination vehicle configured as shown in FIG. 10A whereby the tractor and trailer are configured with deflectable roof fairing extensions that contact the following trailer during normal operation in order to more completely close the gap area between the roofs of each vehicle.

FIG. 10G depicts a side view of a representation of an embodiment of a combination vehicle 200 configured as shown in FIG. 10A whereby the tractor and trailer are configured with deflectable roof fairing extenders 110a-b that contact the following trailer during normal operation in order to more completely close the gap areas 250a-b between the roofs of each vehicle.

In some embodiments, the deflectable roof fairing system may be provided with an elongated member (e.g., a safety wire) that couples (e.g., directly attaches) to the tractor (or the vehicle) and provides a redundant level of safety in the event that the fairing system assembly becomes detached from the vehicle at its primary mounting location. In some embodiments, a spring may be configured to function as a safety wire.

In some embodiments, the deflectable roof fairing system may be configured to improve the aerothermodynamics of a refrigeration unit mounted to a trailer connected to a truck. In some embodiments, the fairing system may function to not only redirect air moving over the vehicle but also redirect air flow between a vehicle and a trailer to increase the airflow around some type of thermodynamic exchange unit which may be used to control the temperature in, for example, a trailer.

In some embodiments, the deflectable roof fairing system may be configured to fit specific models of vehicles, or it may be adapted to provide a substantially or completely universal fit. FIGS. 6A-D depict a top view of a representation of an embodiment of various roofing extenders 110 coupled to various roof fairings 230 using universal fit extenders 110a and custom fit extenders 110b.

In some embodiments, the deflectable roof fairing system may be configured with openings for clearance with vertical exhaust or exhaust stacks. Many semi-trucks may include exhaust stacks and the roof fairing system may include openings and/or a perimeter shape which allows the fairing system to function normally without interfering with the exhaust stacks.

In some embodiments, the deflectable roof fairing system may also be mounted to the front, rear, top, bottom, or sides of a trailer.

In some embodiments, the roof fairing system is attached to the truck and cooperates with the existing aerodynamic roof fairing of the vehicle in order to further improve the aerodynamics and thus the fuel efficiency of a truck in combination with a trailer.

In some embodiments, the roof fairing system may be configured to attach to the existing tractor gap fairings by mounting the deflectable extension along the vertical edge regions at the rear of the tractor side extenders or "gap fairings".

In some embodiments, the roof fairing system may be configured as a deflectable tractor gap fairing by mounting the deflectable extension along the vertical outside edge regions of the rear of the tractor cab (where tractor gap fairings are typically mounted).

In some embodiments, the roof fairing system may be configured to attach to the rear of a trailer or trailer doors by mounting the deflectable extension along the vertical edge region at the rear of the trailer.

In some embodiments, a frontward portion of the roofing extender is coupled to the roof of the vehicle such that there is an opening between the roofing extender and the roof of the vehicle allowing air to flow through the opening during use. The extender in many embodiments is depicted integrated with the existing vehicle roof fairing and trailer roof, but in some embodiments the extender may be spaced away from the existing tractor roof fairing or trailer roof such that there is a gap in between to allow air to flow through the gap.

In some embodiments, a portion of the extender (such as the portion that may contact the trailer) may include portions which absorb or redirect impact (e.g., a rounded edge, pads, etc.) in order to more smoothly permit deflection and absorb impact.

In some embodiments, the roofing extender comprises two or more portions which move independently of one another. The roof fairing extender may be comprised of two or more deflectable extension portions and each extension portion may be deflectable independent of the other. This may be advantageous in the event that the trailer may contact only the left side while turning left, and the right side while turning right, for example. An extension with one or more deflectable portions may also reduce stress on the assembly and provide for more cost effective repairs in the event that one portion is damaged since only one portion would require replacement. The extension portions may not be attached to each other in any real substantial fashion (other than to be coupled to one another through the vehicle the extensions are attached to).

In this patent, certain U.S. patents, U.S. patent applications, and other materials (e.g., articles) have been incorporated by reference. The text of such U.S. patents, U.S. patent applications, and other materials is, however, only incorporated by reference to the extent that no conflict exists between such text and the other statements and drawings set forth herein. In the event of such conflict, then any such conflicting text in such incorporated by reference U.S. patents, U.S. patent applications, and other materials is specifically not incorporated by reference in this patent.

Further modifications and alternative embodiments of various aspects of the invention will be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as the presently preferred embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

What is claimed is:

1. A fairing system for vehicles, comprising:
   a roofing extender couplable rearward of a roof of a vehicle, wherein a frontward portion of the roofing extender is coupled to the roof of the vehicle such that the roofing extender pivots, at the frontward portion, relative to the roof of the vehicle, wherein a rearward portion of the roofing extender is coupled to the vehicle with one or more resilient members which allow the roofing extender to pivot relative to the roof of the vehicle within a specified range as needed before returning to set start point;
   wherein the roofing extender functions to adjust airflow over the roof of the vehicle.

2. The fairing system of claim 1, wherein the roofing extender functions to adjust airflow over the roof of the vehicle and an area between the vehicle and a trailer coupled to the vehicle.

3. The fairing system of claim 1, wherein the roofing extender improves, during use, airflow between the vehicle and the trailer such that an efficiency of a temperature regulation mechanism associated with the trailer is improved by adjusting an airflow adjacent the temperature regulation mechanism.

4. The fairing system of claim 1, wherein the one or more resilient members comprise a spring.

5. The fairing system of claim 1, wherein the one or more resilient members comprise a damper.

6. The fairing system of claim 1, further comprising an adjustment mechanism coupled to the rearward portion of the roofing extender, wherein the adjustment mechanism adjusts a distance between the rearward portion of the roofing extender and a plane within which the roof of the vehicle lies.

7. The fairing system of claim 1, further comprising an adjustment mechanism coupled to the roofing extender, wherein the adjustment mechanism adjusts an angle between the roofing extender and the roof of the vehicle, wherein the adjustment mechanism comprises a power source and a control system such that the angle is adjusted in an automated fashion.

8. The fairing system of claim 1, wherein the roofing extender comprises one or more bushings positioned between the roofing extender and the roof of the vehicle.

9. The fairing system of claim 1, wherein there is an opening between the roofing extender and the roof of the vehicle allowing air to flow through the opening during use.

10. The fairing system of claim 1, wherein the roofing extender comprises two or more portions which move independently of one another.

11. A fairing system for vehicles, comprising:
    a roofing extender couplable frontward of a roof of a vehicle, wherein a rearward portion of the roofing extender is coupled to the roof of the vehicle such that the roofing extender pivots, at the rearward portion, relative to the roof of the vehicle, wherein a frontward portion of the roofing extender is coupled to the vehicle with one or more resilient members which allows the roofing extender to pivot relative to the roof of the vehicle within a specified range as needed before returning to set start point;

wherein the roofing extender functions to adjust airflow over the roof of the vehicle.

12. The fairing system of claim 11, wherein the roofing extender functions to adjust airflow over the roof of a first vehicle and an area between the first vehicle and a second vehicle connected thereto.

13. The fairing system of claim 11, wherein one or more of the resilient members comprises a spring.

14. The fairing system of claim 11, wherein one or more of the resilient members comprises a damper.

15. The fairing system of claim 11, further comprising an adjustment mechanism coupled to the frontward portion of the roofing extender, wherein the adjustment mechanism adjusts a distance between the frontward portion of the roofing extender and a plane within which the roof of the vehicle lies.

16. The fairing system of claim 11, further comprising an adjustment mechanism coupled to the roofing extender, wherein the adjustment mechanism adjusts an angle between the roofing extender and the roof of the vehicle, wherein the adjustment mechanism comprises a power source and a control system such that the angle is adjusted in an automated fashion.

17. The fairing system of claim 11, wherein the roofing extender comprises one or more bushings positioned between the roofing extender and the roof of the vehicle.

18. The fairing system of claim 11, wherein there is an opening between the roofing extender and the roof of the vehicle allowing air to flow through the opening during use.

19. The fairing system of claim 11, wherein the roofing extender comprises two or more portions which move independently of one another.

20. A fairing system for vehicles, comprising:
a roofing extender couplable rearward of a roof of a vehicle, wherein a frontward portion of the roofing extender is coupled to the roof of the vehicle such that the roofing extender can be deflected relative to the roof of the vehicle, wherein a portion of the roofing extender is coupled to the vehicle with one or more resilient members which bias the roofing extender to a non-deflected position;

wherein the roofing extender functions to adjust airflow over the roof of the vehicle.

* * * * *